(12) United States Patent
Dhanjal et al.

(10) Patent No.: US 7,423,534 B2
(45) Date of Patent: Sep. 9, 2008

(54) ELECTRONIC METHOD AND SYSTEM FOR MONITORING CONTAINERS AND PRODUCTS

(75) Inventors: Smriti Gandhi Dhanjal, West Bloomfield, MI (US); Rafael Melendez, Northville, MI (US); Nicholas Griffin, Oak Park, MI (US)

(73) Assignee: Ford Motor Company, Dearborn, MI (US)

( * ) Notice: Subject to any disclaimer, the term of this patent is extended or adjusted under 35 U.S.C. 154(b) by 156 days.

(21) Appl. No.: 11/275,549

(22) Filed: Jan. 13, 2006

(65) Prior Publication Data

US 2007/0164862 A1 Jul. 19, 2007

(51) Int. Cl.
G08B 13/14 (2006.01)

(52) U.S. Cl. .............. 340/572.1; 340/572.4; 340/572.8; 340/539.26

(58) Field of Classification Search .............. 340/572.1, 340/572.4, 572.8, 825.49, 10.1, 825.36, 686.1, 340/10.5, 10.34, 539.26; 235/375, 385
See application file for complete search history.

(56) References Cited

U.S. PATENT DOCUMENTS

| | | | |
|---|---|---|---|
| 6,496,806 B1 * | 12/2002 | Horwitz et al. ............... 705/28 |
| 6,563,417 B1 | 5/2003 | Shaw | |
| 6,600,418 B2 * | 7/2003 | Francis et al. ............ 340/572.1 |
| 6,669,089 B2 * | 12/2003 | Cybulski et al. ............ 235/385 |
| 6,724,308 B2 | 4/2004 | Nicholson | |
| 6,745,027 B2 * | 6/2004 | Twitchell, Jr. ............ 455/422.1 |
| 6,747,560 B2 | 6/2004 | Stevens, III | |
| 6,825,766 B2 | 11/2004 | Hewitt et al. | |
| 6,883,710 B2 * | 4/2005 | Chung ........................ 235/385 |
| 7,053,775 B2 * | 5/2006 | Moore ..................... 340/572.1 |
| 2003/0050871 A1 | 3/2003 | Broughton | |
| 2004/0227630 A1 | 11/2004 | Shannon et al. | |

\* cited by examiner

*Primary Examiner*—Toan Pham
(74) *Attorney, Agent, or Firm*—Gary A. Smith; Brooks Kushman P.C.

(57) ABSTRACT

An electronic method for monitoring the location of a container and one or more products capable of being contained in the container in an operating environment. The method can include the steps of (a) placing an extreme condition identification (ID) tag encoded with a container ID on a location on a container capable of containing one or more products; (b) associating the one or more products with the container ID; and (c) tracking the location of the containers based on the extreme condition ID tag.

20 Claims, 7 Drawing Sheets

ELECTRONIC METHOD AND SYSTEM FOR MONITORING CONTAINERS AND PRODUCTS

BACKGROUND OF THE INVENTION

1. Field of the Invention

One aspect of the present invention generally relates to an electronic method and system for monitoring containers and products.

2. Background Art

Quality campaigns are typically performed in powertrain manufacturing environments in a passive and manual manner. A quality campaign is typically initiated when a potential quality issue with respect to an engine or transmission, otherwise referred to as products, becomes known. A "campaign" of potential suspect products can be initiated, often resulting in a quarantine, stop ship and/or recall of the product with the necessary repairs being performed.

Depending on the location of the product, a different set of steps are typically conducted with respect to the quality campaign. If the product is in transit before final vehicle shipment, the product may be fixed at the assembly plant. If the product is already in a vehicle within the assembly plant, then the shipment may be stopped. If the product is in a vehicle and has left the assembly plant, then the product is typically fixed at the dealer location. The extreme manufacturing conditions in vehicle assembly plants make the execution of quality campaigns difficult.

Various tracking systems have been devised to aid in the execution of quality campaigns. These systems may provide (1) inventory management, (2) location tracking, (3) cluster management, (4) shipping information management, and/or (5) accounts receivable triggering. These systems can assist in quality campaigns, but are not proactive in nature.

According to one system, products, e.g. engines and transmissions, are uniquely identified via a unique ID. The engines and transmissions are loaded onto containers, for example, metal racks, which have to endure extremely harsh conditions. The metal racks are typically stored outside and are typically used during trimodal shipments. It is difficult to keep track of the metal racks because they cannot be permanently tagged with barcode stickers because of the extreme elements. Moreover, the engines and transmission may look the same but are calibrated differently depending on the vehicle type they are married into. A visual inspection to ensure that all the engines and transmissions in a rack are of a similar type is not a reliable or manually feasible method of error proofing mixed racks. Shipments of mixed racks from powertrain plants tend to cause misbuilds at the vehicle assembly plants, resulting in major cost issues.

In many situations, a supplier and/or a powertrain plant identifies the existence of a campaign issue. For example, a supplier may flag a series of defective soft camshafts that were accidently shipped to a powertrain plant for assembly. The supplier may provide the shipment date of the defective parts, allowing the powertrain plant to identify the potential universe of engines manufactured with the defective soft camshafts. Due to the complexities of the powertrain plant's logistics system, the powertrain plant may pad the suspect production sufficiently to cover about 4-5 times the amount of original suspects. Disadvantageously, a large number of good engines are flagged as suspects using this system.

Moreover, the assembly plant may be aware of the engine or transmission unique ID of the potential suspects, but is not aware of the exact location of engine or transmission. Therefore, the potential suspects may still be at a powertrain plant, at a warehouse or in transit to one or more assembly plants.

Manually tracking of suspect engines or transmission via handheld scanners is usually cost prohibitive and sometimes impractical, as the metal racks containing them are stacked vertically. If the suspects are found at the assembly plant at the time of install into vehicle, the cost associated with stopping the line and reconfiguring the pipeline is extremely difficult.

Managing and tracking metal racks used for transportation of engines and transmissions is also an issue as attrition of the racks is very common due to unavailability of their location information.

In light of the foregoing, an electronic method and system for monitoring containers and products is needed. What is also needed is an electronic method and system for managing containers and products.

SUMMARY OF THE INVENTION

One aspect of the present invention is an electronic method and system for monitoring containers and products. Another aspect of the present invention is a method and system for managing containers and products. According to one aspect, containers and products can be tracked in extreme manufacturing conditions and metallic environments that may cause interference issues resulting in reliability problems.

According to a first embodiment of the present invention, an electronic method for monitoring the location of a container and one or more products capable of being contained on or in the container is disclosed. The method can include the steps of: (a) placing an extreme condition identification (ID) tag encoded with a container ID on a location on a container capable of containing one or more products; (b) associating the one or more products with the container ID; and (c) tracking the location of the container based on the extreme condition ID tag.

According to a second embodiment of the present invention, an electronic system for monitoring the location of a container and one or more products capable of being contained on or in the container is disclosed. The system includes (a) one or more extreme condition identification (ID) tag encoded with a container ID on a location on a container capable of containing one or more products; (b) a database for storing the association of the one or more products with the container ID; and (c) one or more tracking devices for tracking the location of the container based on the extreme condition tag.

According to a third embodiment of the present invention, an electronic or barcode method for monitoring the location of a container and one or more products capable of being contained on or in the container is disclosed. The method includes (a) placing an extreme condition radio frequency identification (RFID) tag encoded with a container identification (ID) or a polyurethane tag with code 128 bar coding on a location on a container capable of containing one or more products; (b) associating the one or more products with the container ID; (c) tracking the location of the container based on the extreme condition tag or barcode; (d) tracking the location of the container via one or more radio frequency (RF) interrogators or barcode readers capable of identifying the location of the extreme condition RFID tag; (e) placing the one or more RF interrogators or barcode readers at one or more tracking device placement locations; and (f) transmitting the location of the container.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

According to one embodiment of the present invention, an electronic method for monitoring the location of a container and one or more products capable of being contained in or on the container in an operating environment is disclosed. The method can include the steps of (a) placing an extreme condition identification (ID) tag encoded with a container ID on a location on a container capable of containing one or more products; (b) associating the one or more products with the container ID; and (c) tracking the location of the containers based on the extreme condition ID tag.

Figure 1:
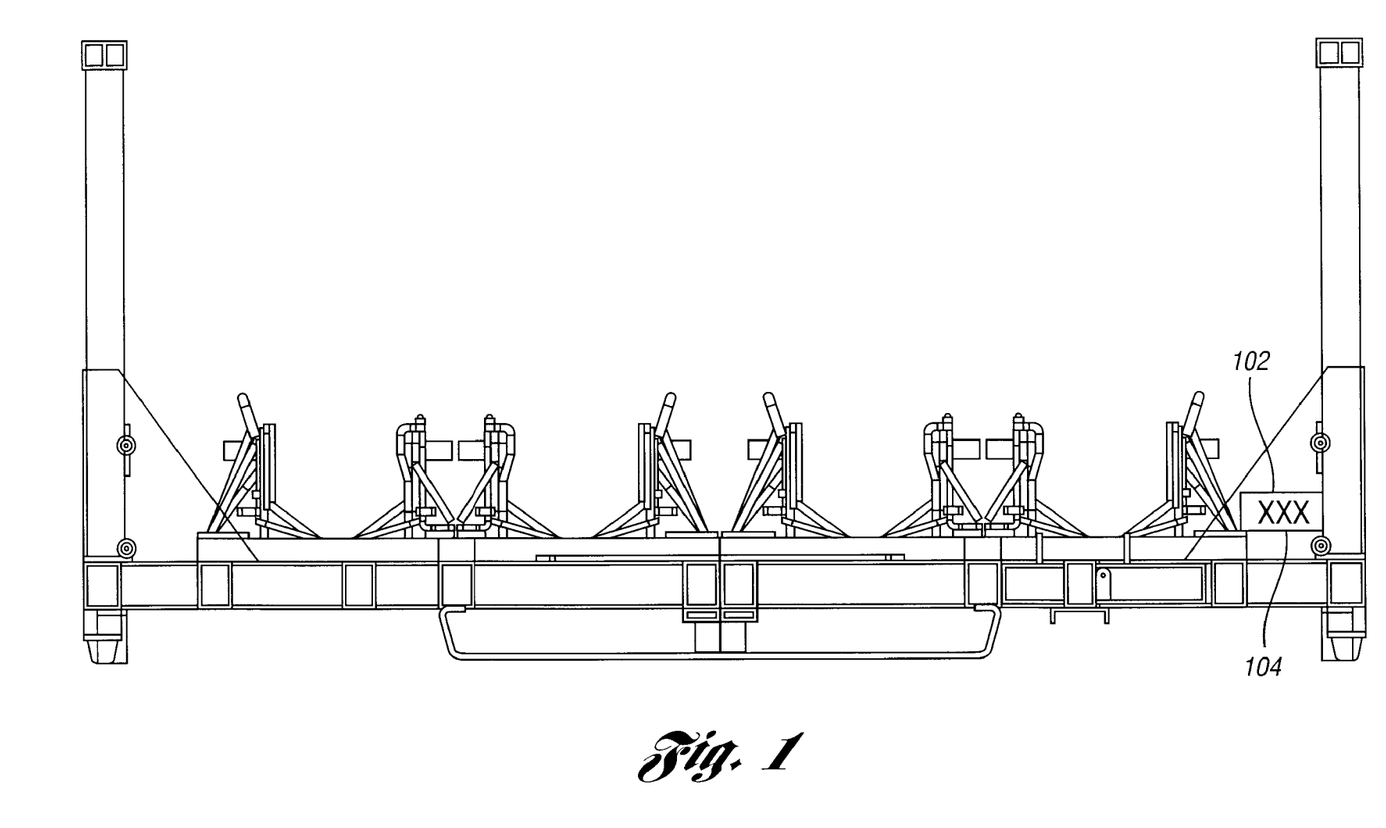
FIG. 1 is an example of an radio frequency identification tag located on a rack container according to one embodiment of the present invention.

In certain embodiments, an extreme condition identification (ID) tag can be used to uniquely identify a rack container, for example a metal rack, for containing powertrain assemblies, e.g. engine or transmission assemblies. Non-limiting examples of extreme condition ID tags include radio frequency identification (RFID) tags and barcodes. The extreme condition ID tag can be placed on the rack at a position where it can be read via a reader or scanner, which can be fixed at a drop point, e.g. the location where an engine or transmission is dropped and/or at a fork lift during the pickup of the rack. As shown in FIG. 1, rack 100 includes an extreme condition ID tag 102 placed at location 104. The extreme condition ID tag can be encoded with the rack container ID, as well as one or more rack characteristics (non-limiting examples include loadable product type, color, capacity and possible target locations). This encoded information can be stored in a central database, depicted as item 632 of FIG. 8.

In certain embodiments, a barcode sticker can be placed on an engine or transmission assembly to uniquely identify such assembly. In addition to the unique ID of the assembly, the barcode can also be encoded with information relating to the history of the assembly, which can be referred to as the birth history. The birth history can be stored in a birth history database. The birth history database can also store campaign management information. In certain embodiments, this information is stored in a separate table in the central database, which is cross referenced with the birth history database to verify rack status, i.e., good or bad rack. In certain embodiments, storage of birth history information can trigger an assembly campaign. The birth history information can include information on parts and/or processes used in building up engines and/or transmissions. This information can include time stamps for each birth history event.

At an engine or transmission assembly drop point, a reader or scanner scans the RFID of the rack. At this point, historical data associated with the rack is archived, thereby clearing storage space on the central database for new information. The reader or scanner device scans the barcode on the engine or transmission assembly to obtain the unique ID of the product to be loaded into the rack. The engine or transmission unique ID can also be transmitted from a computer in communication with the birth history database. A visual confirmation can be provided on a computer display to confirm receipt of the unique ID.

At this point in the process, an association is made between the rack and its contents, i.e. its products. This association can be stored in the central database and can link the container ID with the unique product IDs. Moreover, the integrity of the rack can be checked. The integrity check can ensure that all assemblies are of the same type (no mixed rack error proofing), the correct number of engines and transmissions are loaded into the rack (no partial racks error proofing) and no current active campaigns exist on the engines or transmissions being loaded. These integrity checks can otherwise be referred to as conditions. If all of the conditions are true, a visual indication via a green light on a computer display can inform an operator the loaded rack is "good." The rack can then be moved to a shipping area or a storage location. If any of the conditions are false, a red light can notify the operator and the rack is removed from an automated transfer mechanism to the repair area. The good racks are either sent to a shipping dock for immediate shipment managed by the shipping manifestos or to a storage location. All racks, whether good or bad, are assigned a location by a fork lift operator or a shipping clerk. This can be accomplished via a drop down menu on a handheld device or the forklift computer.

At the shipping dock, the shipping department creates a shipment manifesto including the product type, quantity, date and destination. This manifesto is provided in real time to the fork lift operator via a computer, for example, a personal computer or handheld device having wireless communication capabilities. The fork lift operator (or shipment clerk with a handheld device), when ready to load the conveyance, e.g. carrier, truck or rail car, picks the conveyance number from a pick list on the handheld device or a personal computer mounted on a fork lift. The fork lift operator or the shipping clerk then scans or reads the rack IDs through the extreme condition ID tag of every rack being placed in the conveyance. At the time of scan, checks can be performed for mixed rack, campaigned rack/assembly, correct rack for the conveyance, and/or correct product for rack. If any of these system checks fail, a visual display is provided to the operator and the operator has the opportunity to move the rack to a quarantine area for further evaluation. The operator also has the ability to override a system check failure, in which case a log file is generated regarding the override activity.

As the racks are loaded, a check failure counter can count down to ensure the fork lift operator or the shipping clerk loads the correct quantity of product. After the racks have been loaded, the shipping department coordinator closes the shipment. If the fork lift operator and/or shipping clerk has overridden a system check failure at the time of load, the shipping coordinator confirms closing of a possible erroneous shipment, thereby locking the shipment and allowing the shipper to view the entire contents of the load. The racks and product remain active until the conveyance or empty rack is returned to the plant and are loaded again.

When a campaign management issue arises, the suspect engine and/or transmission assembly unique product IDs, otherwise referred to as the unique IDs, are identified and a campaign manifesto is created via upload of a flat file from the birth history database or manual entry.

In certain embodiments, any instance wherein a rack or product is scanned, a real time query against all open campaign manifestos is conducted and operators are alerted accordingly. The resolution of the campaigns is conducted real-time via all the scanning devices with proper user authorization.

Figure 2:
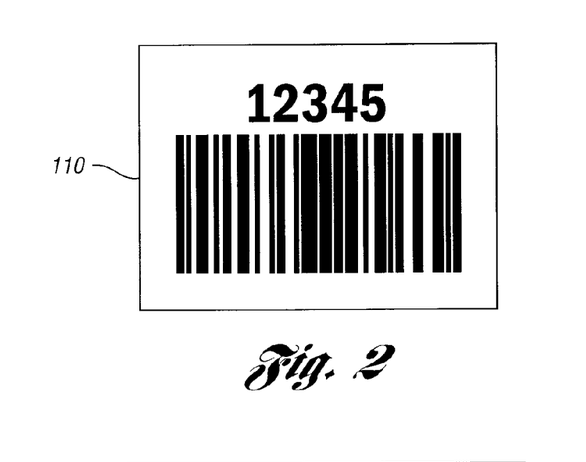
FIG. 2 depicts an example of a barcode sticker according to one embodiment of the present invention.

In certain embodiments, the engine or transmission assembly is uniquely identified using a Code 128 barcode sticker in a clear line of sight of an Intermec IF4 reader coupled with Intermec IntelliTag Antenna for RFID tags at the drop location. The Code 128 barcode can be printed onto a barcode sticker using printing software. FIG. 2 depicts an example of a barcode sticker 110 according to one embodiment of the present invention. Non-limiting examples of barcode stickers include a film material or aluminum tag. The film material can be SCOTCHCAL 3690E, 3698E or 3690-906E Label Films, available from 3M of St. Paul Minn. The aluminum tag can be a Lasable white aluminum tag (available from Pannier Corp. of Pittsburgh, Pa.), with a 0.010 inch thickness, a 3.5 inch width and 2.5 inch length. The aluminum tag can be affixed with a transfer tape, such as 3M adhesive transfer tape, No. 9485C. The Intermec products are available from Intermec Technologies Corp. of Everett, Wash. The engine serial number can be provided by a programmable logic controller (PLC) of the plant production system.

The metal racks can be tagged with Marconi Tag 915 MHZ stick tags (otherwise referred to as the Intermec 915 MHZ Stick Tag) using 3M adhesive transfer tape, No. 9485C.

The stick tags can be placed on the front right inter leg based on the pickup direction by the fork lifts and location of the IntelliTag Antenna on the fork lift. The location of the tag is shown in FIG. 1 and is at least 26 inches from the bottom of the rack according to certain embodiments. One or more fork lifts can be equipped with an Intermec IF4 fixed reader, Rugged Tablet PC for an operator interface (Xplore Technologies Dual Mode rugged tablet PC part # IX104C2 or Intermec 5055 Vehicle mount computer), and an IntelliTag Maxrad Antenna. The Xplore product is available from Xplore Technologies of Austin, Tex. The IntelliTag product is available from Intermec Technologies Corp.

Depending on how many racks picked up, one to three antennas can be mounted on the fork lift. In certain embodiments, the handheld devices used are Intermec 750 using PocketPC 2003 Client 9 or Symbol MC9000G series terminal with windows mobile 2003 PocketPC and an Intermec 1555 to read RF tags and/or barcodes. The PocketPC product is available from Microsoft Corp. of Redmond, Wash. The Symbol product is available from Symbol Technologies of Holtsville, N.Y. The central database is an SQL server database, although any other database capable of similar transactions can be used.

Figure 3:
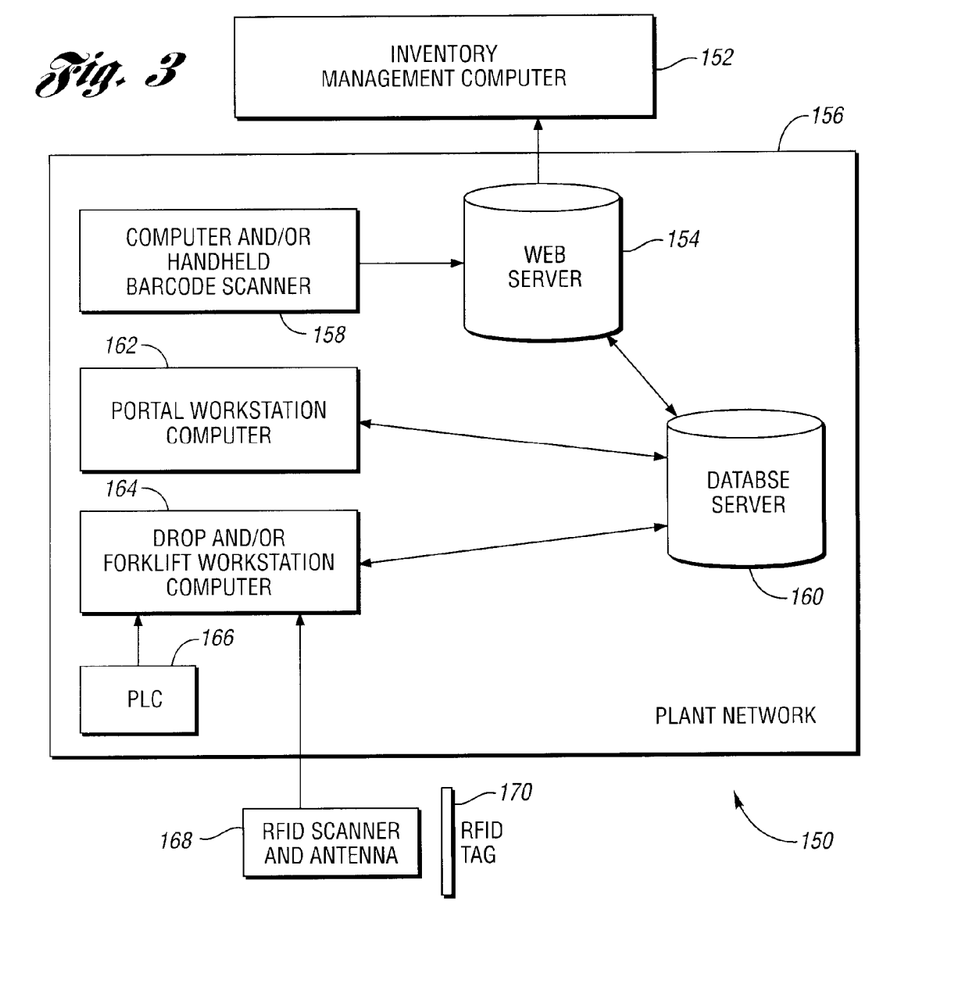
FIG. 3 depicts an example of computer environment according to one embodiment of the present invention.

FIG. 3 depicts a computer environment 150 for implementing one or more embodiments of the present invention. Computer environment 150 includes inventory management computer system 152 for generating shipment orders. These shipment orders can be transmitted to and received by a web server 154 through an Ethernet line using FTP. In certain embodiments, the web server is located in a plant server room.

Web server 154 is a part of the plant network, depicted by box 156. The plant network 156 can include Ethernet communication lines. Web server 154 can communicate with computers and/or handheld barcode scanners 158 using HTTP protocol and wired (e.g. CAT5) or wireless (e.g. using 802.11b or g wireless protocol) communication lines.

The plant network 156 also includes a database server 160, otherwise referred to as a central database, which can be placed in the plant server room. The web server 154 and database server 160 can communicate using a standardized query language, e.g. ODBC or SQLNET. Database server 160 can also communicate with a portal workstation computer 162, over an Ethernet line or other communication path. The portal workstation computer 162 is commonly used if the plant network 156 is utilizing one or more user portals. Database server 160 also communicates with drop and/or fork lift workstation computers 164, using an Ethernet line, wireless communication, etc. A non-limiting example of a workstation computer is a personal computer. Workstation computers 162 and 164 can communicate with one another through TCPIP protocol and an Ethernet communication line. A programmable logic control (PLC) 166 can be in communication with workstation computer 164 using an RS232 cable or other communication line.

RFID scanner and antenna pair 168 can scan an RFID tag 170 and transmit the data encoded on the tag to workstation computer 164.

Figure 4:
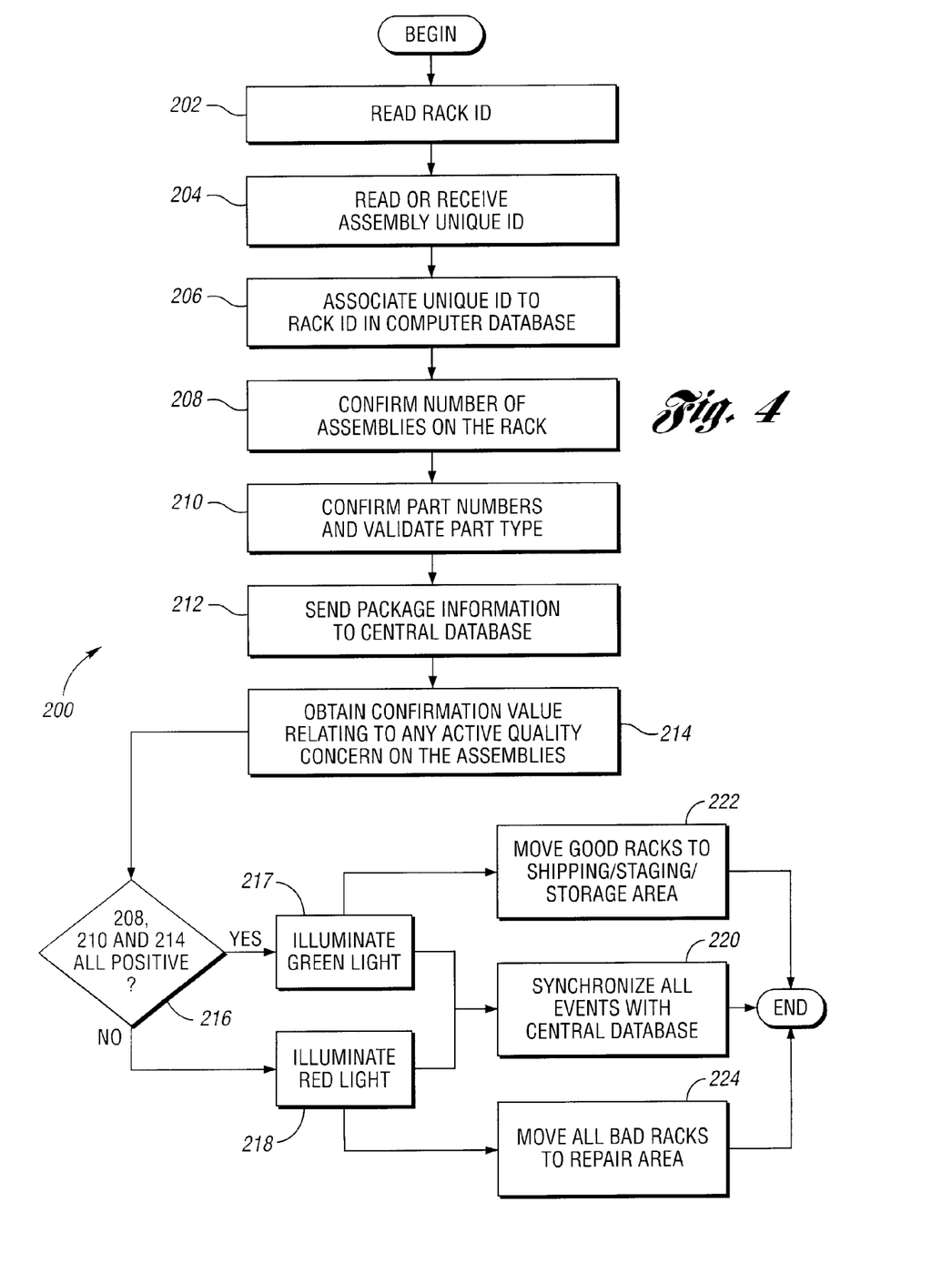
FIG. 4 is a flowchart of the steps that occur at a powertrain drop off location according to one embodiment of the present invention.

Having thus described one computer environment of the present invention, FIG. 4 describes a flowchart 200 of the steps that occur at an engine or transmission assembly drop off location that can be implemented using such a computer system or other computer system. In block 202, a rack ID is read from a RFID tag. For example, the rack RFID tag can be read with a reader or scanner. In block 204, the assembly unique ID is read or received. The unique ID can be read if the unique ID is encoded in a barcode sticker located on the assembly. The unique ID can also be received from a PLC. In block 206, the unique ID is associated with the rack ID in a computer database. In block 208, the number of assemblies is confirmed. As an example, the confirmation can be based on rack characteristics, e.g. capacity, that are stored in the database.

In block 210, the part numbers of the assemblies are confirmed and the type of assemblies is validated, i.e. no mixed rack. In block 212, package information is transmitted to a central database. In block 214, a confirmation value relating to active quality concerns for the assemblies is obtained. This value can be obtained in real-time via access to the central database upon reading the unique ID. A positive value means that there are no active quality concerns relating to the unique ID. A negative value means that there are one or more active quality concerns relating to the unique ID.

If the blocks 208, 210 and 214 are confirmed positive, then a green light can be illuminated through a physical light mounted on a pole or other support structure so that the light is easily visible in the plant (decision block 212 and block 216). The computer can be used by a fork lift operator. The green light can be a visual indicator at a drop point that a "good rack" has been processed.

If block 208 or block 210 or block 214 is confirmed negative, then a red light can be illuminated on through a physical light (block 218). The computer can be used by a fork lift operator. The red light can be a visual indicator at a drop point that a "bad rack" has been processed.

In block 220, the events referred to in blocks 202 through 214 can be synchronized with the central database. In block 222, all "good racks" are moved to a shipping, staging and/or storage areas. In block 224, all "bad racks" are moved to a repair area. The actions of blocks 222 and 224 can be carried out by a fork lift operator.

Figures 5, 6:
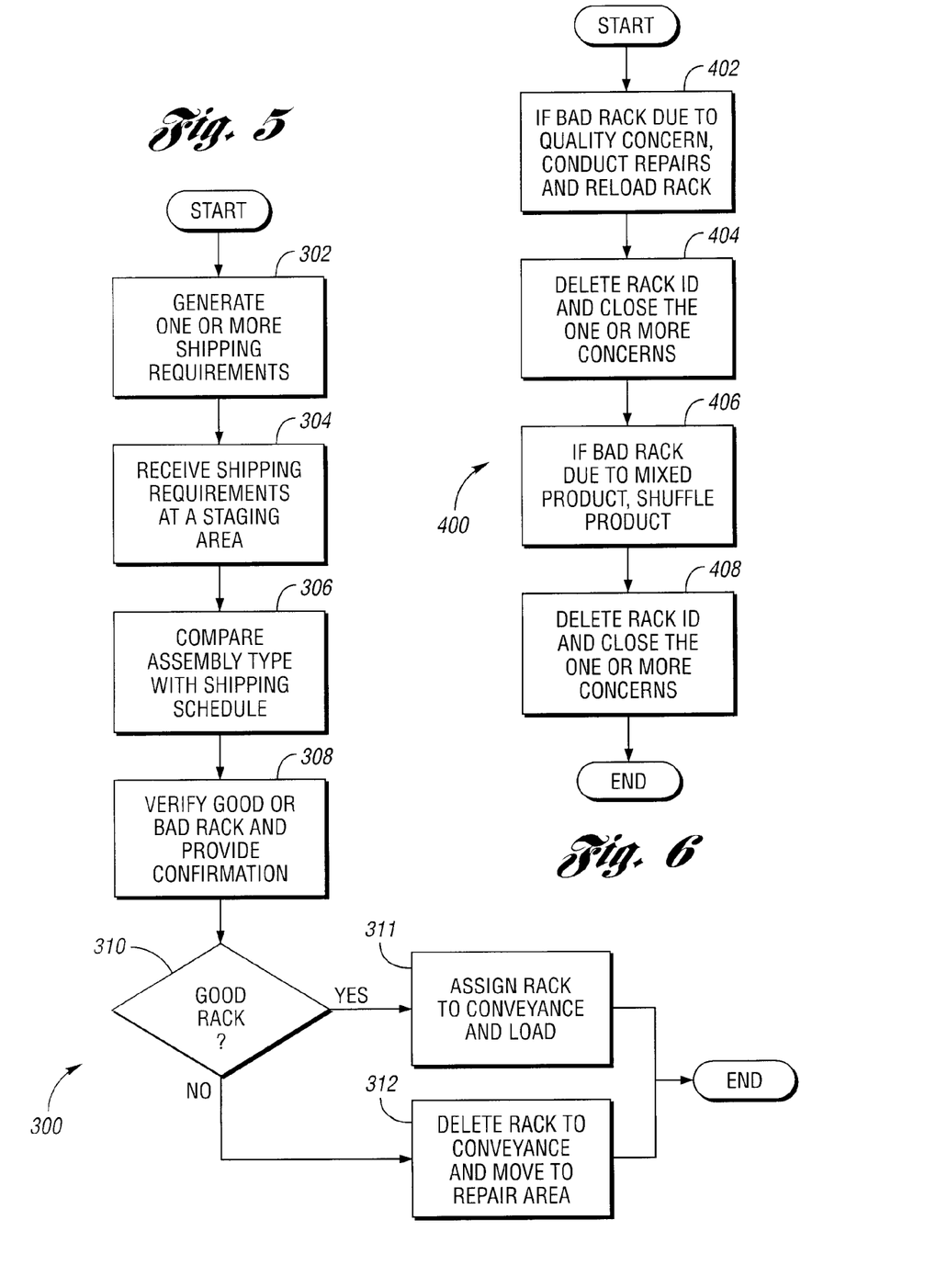
FIG. 5 is a flowchart of the steps that occur at a loading dock according to one embodiment of the present invention.
FIG. 6 is a flowchart of the steps that occur at a repair dock according to one embodiment of the present invention.

FIG. 5 is a flowchart 300 of the steps that occur at a loading dock according to one embodiment of the present invention. In block 302, one or more shipping requirements are generated. A shipping computer system can generate the shipping requirements, e.g. engine type, quantity, conveyance information destination location and date, etc. In block 304, the shipping requirements are received at a staging area. A fork lift operator can arrange the receipt of the shipping requirements. In block 306, a rack can be selected and the assembly type on the selected rack is compared with the shipping schedule. The fork lift operator can select the rack. A computer mounted on the fork lift can be used to compare the type with the shipping schedule.

In block 308, the rack status, i.e. "good" or "bad" rack, is verified and confirmed. The verification can be carried out by a fork lift operator using the fork lift computer. The confirmation can be an audio and/or video confirmation executed by the fork lift computer. If the rack is "good", the rack is assigned to conveyance and the conveyance is loaded (decision block 310 and block 311). If the rack is "bad", the rack is deleted to conveyance and moved to a repair area (block 312).

FIG. 6 is a flowchart 400 of the steps that occur at a repair dock according to one embodiment of the present invention. In block 402, if a rack is "bad" because of a quality concern, the rack is repaired and reloaded. In block 404, the rack ID related to the "bad rack" is deleted and the one or more concerns are closed. The action described in block 404 can be aided by a handheld device. In block 406, if the "bad rack" is due to mixed product, the product is shuffled. Once the product is successfully shuffled, the rack ID related to the "bad rack" is deleted and the one or more concerns are closed.

Figure 7:
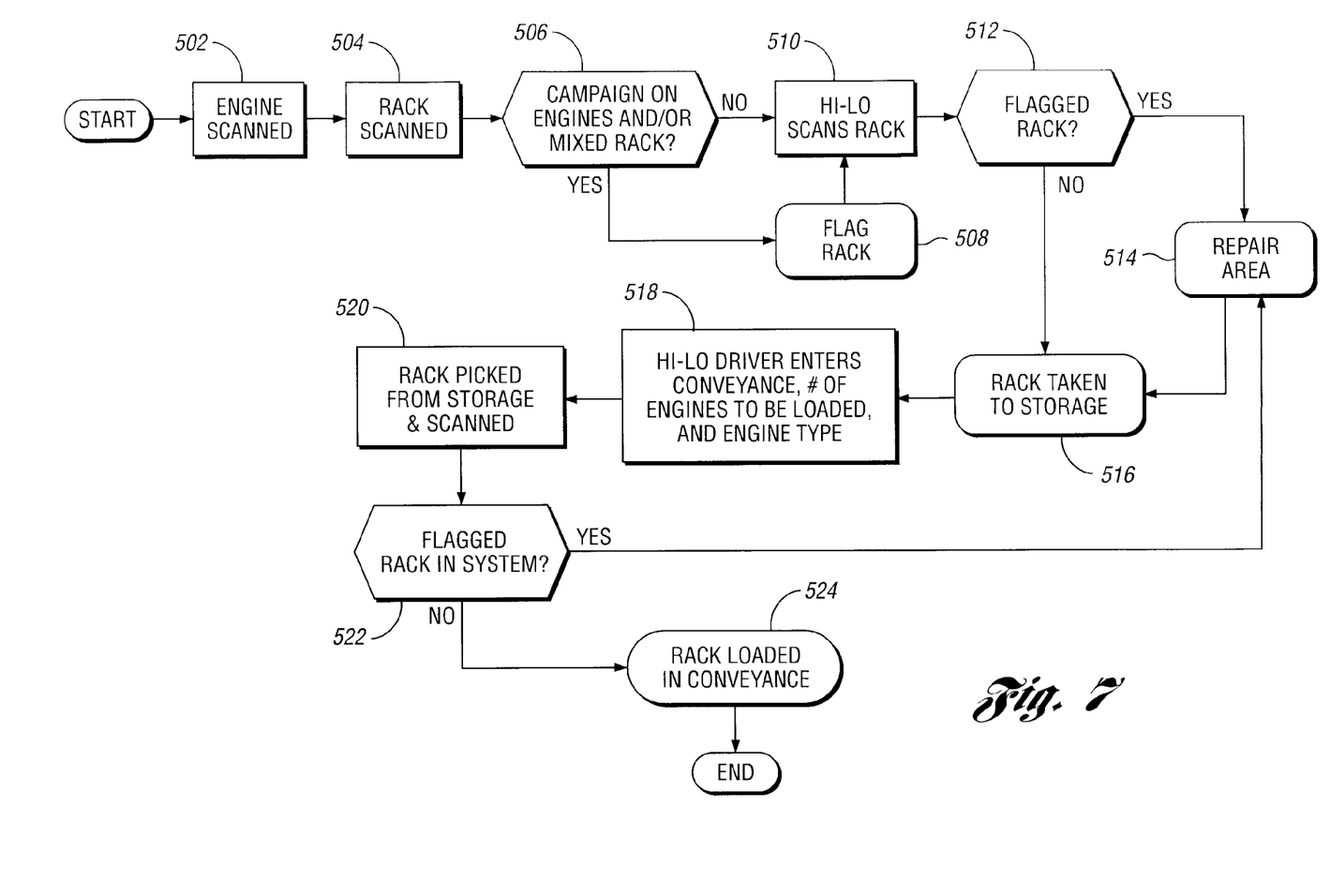
FIG. 7 is a process flow diagram according to one embodiment of the present invention.

FIG. 7 is a process flow diagram 500 according to one embodiment of the present invention. In block 502, an engine (or transmission) is scanned. In block 504, the rack containing the engine (or transmission) is scanned. Decision block 506 asks whether there is a campaign on the engine(s) and/or is there a mixed rack. If yes, the rack is flagged, as depicted in block 508. If no, a hi-lo scans the rack, as depicted in block 510. Decision block 512 asks whether a flagged rack exists. If yes, the flagged rack is sent to a repair area, as depicted in block 514. At the repair area, the engines are disassociated from the rack, repopulated and rescanned. Once the rack is repaired or when there is no flagged rack, the rack is taken to storage, as depicted in block 516. In block 518, the conveyance, number of engines to be loaded and engine type are entered, by a hi-lo driver, for example. The rack is then picked from storage and scanned, as depicted in block 520. Decision block 522 asks whether a flagged rack exists. If yes, the flagged rack is sent to the repair area. If no, the rack is loaded to conveyance, as depicted in block 524. Advantageously, decision blocks 506, 512 and 522 can rectify "bad racks" in an effective and timely manner.

Figure 8:
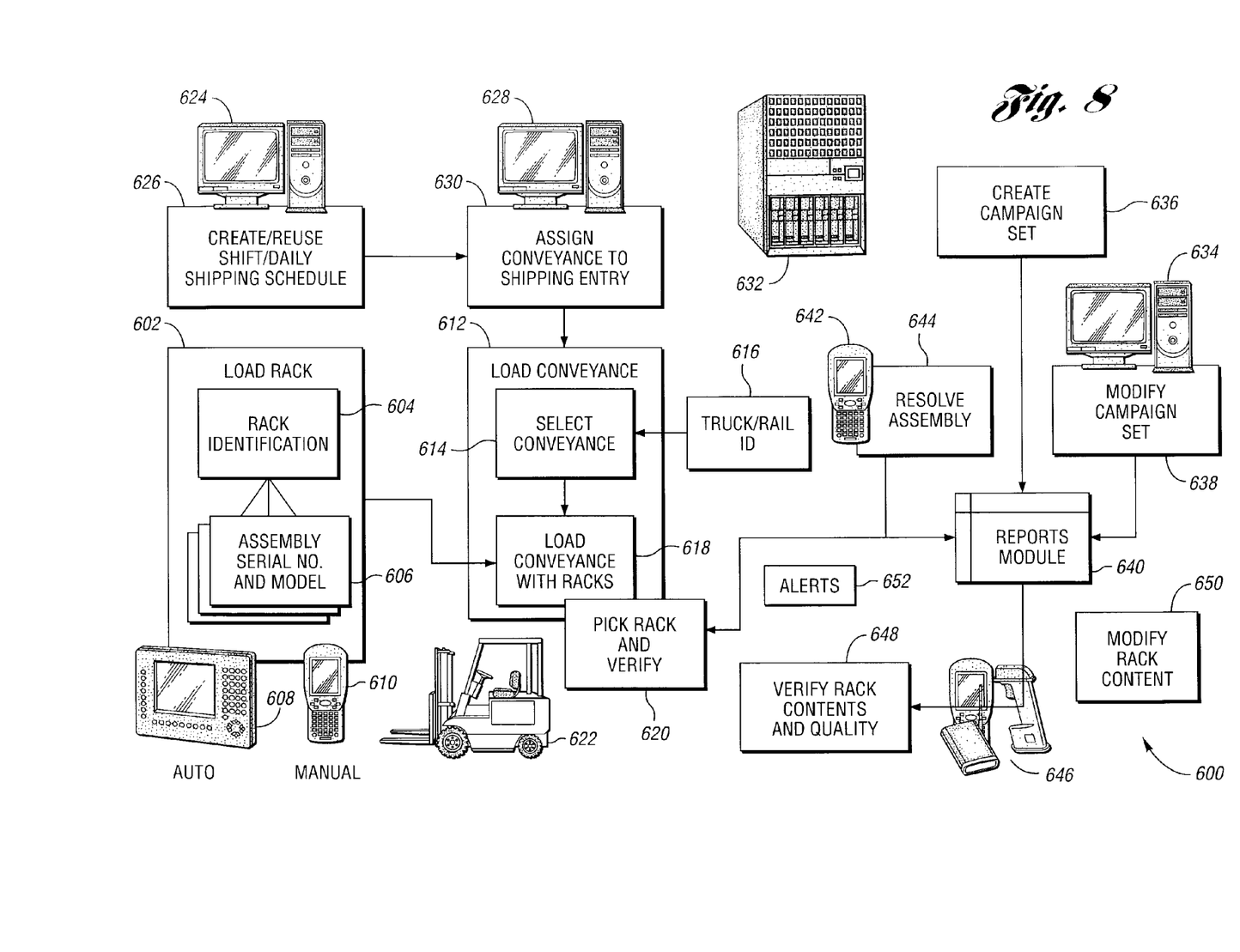
FIG. 8 is a hardware infrastructure according to one embodiment of the present invention.

FIG. 8 is a hardware infrastructure 600 according to one embodiment of the present invention. In the rack loading area 602, the rack ID 604 and the assembly serial number and model 606 are obtained via automatic means 608 and/or manual means 610.

In the load conveyance area 612, a conveyance is selected (block 614) based at least partially on a truck or rail ID 616. In block 618, the conveyance is loaded with the rack. In block 620, the rack is picked, loaded and verified. In certain embodiments, the actions depicted in blocks 614, 618 and 620 can be carried out by a fork lift operator 622.

In advance of the load conveyance actions, a first computer 624 can be used to create/reuse shift/daily shipping schedules, as depicted in 626, and a second computer 628 can be used to assign a conveyance to a shipping area, as depicted in block 630. In certain embodiments, the first and second computers are the same computer.

Central computer 632 can be used to transmit, receive, store and retrieve data and information used throughout system 600.

A third computer 634 can be used to create a campaign set (block 636) and/or modify a campaign set (block 638). The campaign set information can be sent to reporting module 640 for generating reports.

A handheld device 642 can be used to resolve assembly issues 644, wherein the resolution is transmitted to report module 640. A scanner and transmitter 646 can be used to verify rack contents and quality. According to block 650, the rack contents can be modified.

As depicted in block 652, reports module 640 generates one or more alerts, which can be transmitted to the load conveyance area.

Figure 9:
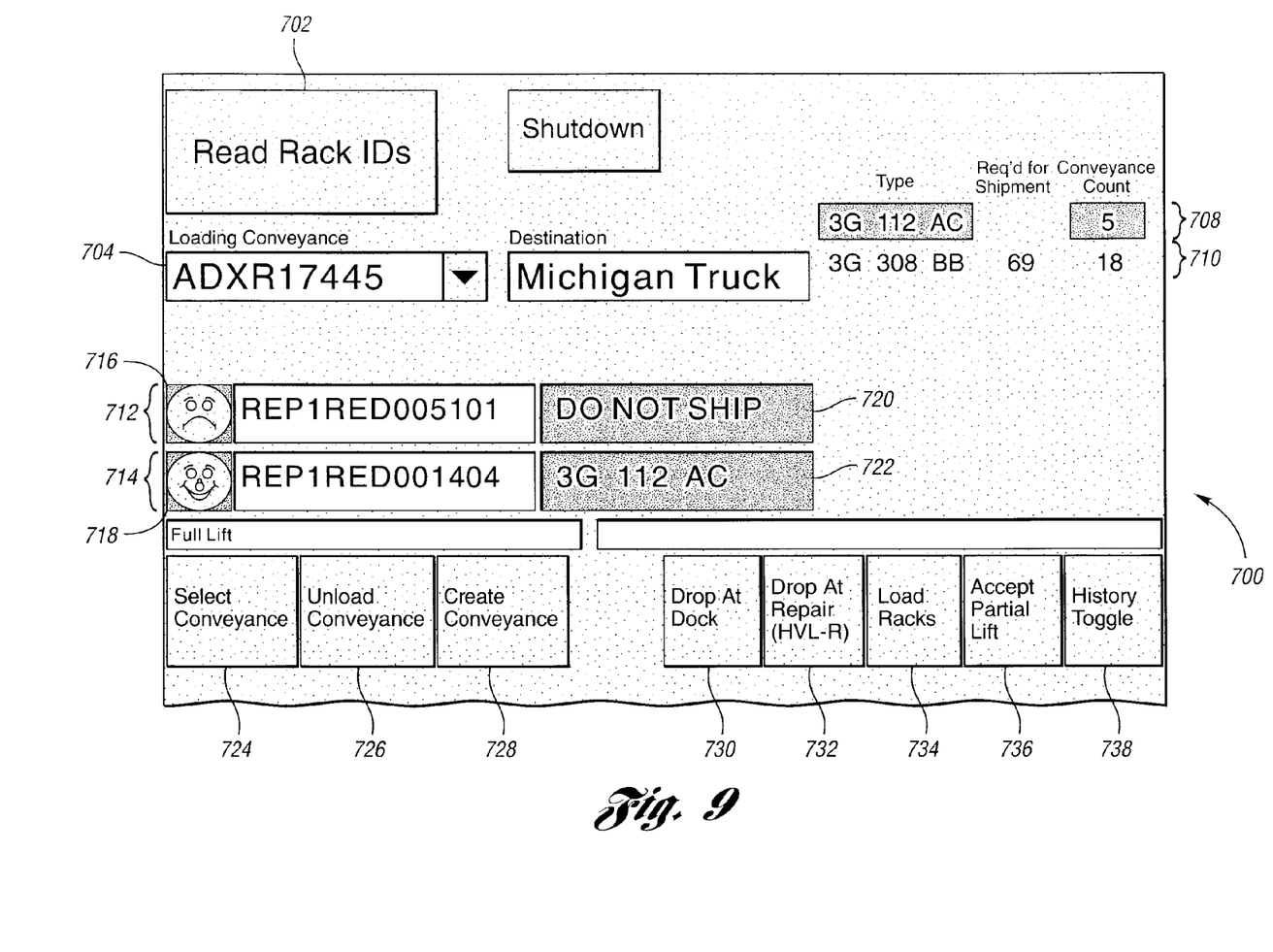
FIG. 9 is an example of a fork lift operator graphical user interface according to one embodiment of the present invention.

FIG. 9 is an example of a fork lift operator graphical user interface (GUI) 700 according to one embodiment of the present invention. GUI 700 includes a "Read Rack ID" button 702 for initiating the rack ID reading process. GUI 700 also includes conveyance load drop down box 704 for selecting an applicable conveyance, and a destination input box 706 for entering the destination for the rack. Information of each scanned rack ID is displayed on GU 700. For example, the "type", "required for shipment". And conveyance count for each scanned rack is displayed in rows 708 and 710. If this information indicates a "bad rack", the information in the row is highlighted, as depicted in row 708. The scanned rack ID number is also displayed, for example in rows 712 and 714. Each row also includes a graphical icon for depicting whether a rack is "good" or "bad". Icon 716 indicates a "bad rack"; icon 718 indicated a "good rack". The icon can be shaded to indicate the rack status. For example, a red shading can indicate "bad" and a green shading can indicate a "good" rack. Column 720 displays a shaded "DO NOT SHIP" message 720 if it is a "bad rack" and a shaded type number 722 if the rack is "good".

GUI 700 also includes the following click buttons: "Select Conveyance" 724 for selecting a conveyance; "Unload Conveyance" 726 for unloading a conveyance; "Create Conveyance" for creating a conveyance; "Drop At Dock" 730 for indicating the drop of a rack at a dock; "Drop At Repair" 732 for indicating the drop of a rack at a repair area; "Load Racks" 734 for indicating the loading of a rack; "Accept Partial Lift" 736 for indicating the acceptance of a partial lift; and "History Toggle". If pushed, the "History Toggle" returns (1) the time, (2) serial number, (3) product code and/or (4) communication port of the antenna associated with the scanner that scanned the rack, for each of the previously scanned products and/or racks.

While the best mode for carrying out the invention has been described in detail, those familiar with the art to which this invention relates will recognize various alternative designs and embodiments for practicing the invention as defined by the following claims. For example, the monitoring system was described with reference to a destination ramp system. It should be understood that the methods and systems of the present invention can also be applied to outbound ramp systems and hybrid outbound/destination ramp systems.

What is claimed:

1. An electronic method for monitoring the location and integrity of a container and one or more products capable of being contained in the container in an operating environment, the method comprising the steps of:
   (a) placing an extreme condition identification (ID) tag encoded with a container ID on a location on a container capable of containing one or more products;
   (b) placing a unique product ID tag encoded with one or more product IDs and product birth histories on one or more products loaded into the container, wherein the one or more product IDs are associated with the one or more product birth histories;
   (c) associating the one or more products in the container with the container ID; and
   (d) tracking the location of the container based on the extreme condition ID tag and determining the integrity of the container based on the product birth histories.

2. The electronic method of claim 1, wherein the extreme condition ID tag is an extreme condition radio frequency identification (RFID) tag made of a film material, aluminum or polyurethane, and step (d) includes:
   (d) tracking the location of the container via one or more radio frequency (RF) interrogators capable of identifying the location of the extreme condition RFID tag.

3. The electronic method of claim 2, further comprising:
   (e) placing the one or more RF interrogators at one or more locations selected from the group consisting of: one or more drop points, one or more fork lifts, and one or more handheld scanner.

4. The electronic method of claim 1 further comprising:
   (e) identifying the container and the one or more products contained on the container based on the container ID and the one or more products; and
   (f) determining campaign information of the one or more products based on the one or more product birth histories.

5. The electronic method of claim 1, further comprising:
   (e) receiving a quality concern regarding one of the one or more products contained in the container; and
   (f) associating the quality concern with the container ID and the one of the one or more products having a quality concern.

6. The electronic method of claim 5, wherein step (f) includes:
   (f) associating the quality concern in real time in response to receiving the quality concern.

7. The electronic method of claim 6, further comprising:
   (g) transmitting the quality concern.

8. The electronic method of claim 5, further comprising:
   (f) updating the quality concern.

9. The electronic method of claim 1, wherein the container is a rack and the one or more products is selected from the group consisting of at least one engine and at least one transmission.

10. The electronic method of claim 9, wherein the rack is a single, multiple, or contiguous rack.

11. The electronic method of claim 1 wherein step (c) includes:
    (c) associating the one or more products with the container ID at about the drop time for the one or more products.

12. The electronic method of claim 1, further comprising:
    (a) selecting the location of the extreme condition ID tag on the container based on the primary operating environment of the container.

13. The electronic method of claim 12, wherein the primary operating environment is a manufacturing plant.

14. The electronic method of claim 1, wherein the extreme condition tag is an extreme condition barcode sticker and the method further comprises receiving the one or more product birth histories indicating the integrity of the container based on the one or more product ID tags.

15. An electronic system for monitoring the location and integrity of a container and one or more products capable of being contained on the container in an operating environment, the system comprising:
    (a) one or more extreme condition identification (ID) tag encoded with a container ID on a location on a container capable of containing one or more products;
    (b) a unique product ID tag encoded with one or more product IDs and product birth histories on one or more products loaded into the container, wherein the one or more product IDs are associated with the one or more product birth histories;
    (c) a database for storing the association of the one or more products in the container with the container ID and for checking the one or more product birth histories for indicating the integrity of the container; and
    (d) one or more tracking devices for tracking the location of the container based on the extreme condition ID tag and for determining the integrity of the container based on the product birth histories.

16. The system of claim 15, wherein the one or more extreme condition ID tag is an extreme condition radio frequency identification (RFID) tag, made of a film material, aluminum or polyurethane and the tracking device is one or more radio frequency (RF) interrogators capable of identifying the location of the extreme condition RFID.

17. The electronic system of claim 16, further comprising:
    (e) one or more tracking device placement locations for tracking the location of the container, wherein the one or more tracking device placement locations are selected from the group consisting of: one or more drop points, one or more fork lifts, and one or more handheld scanner.

18. The electronic system of claim 15, wherein the database is capable of associating a quality concern related to one of the one or more products with the container ID.

19. The electronic system of claim 18, further comprising:
    (f) one or more transmitters for transmitting the quality concern to the one or more tracking devices.

20. An electronic method for monitoring the location and integrity of a container and one or more products capable of being contained on the container in an operating environment, the method comprising the steps of:
    (a) placing an extreme condition radio frequency identification (RFID) tag encoded with a container identification (ID) on a location on a container capable of containing one or more products;
    (b) placing a unique product identification (ID) tag encoded with one or more product IDs and product birth histories on one or more products loaded into the container, wherein the one or more product IDs are associated with the one or more product birth histories to determine the integrity of the container;

(c) associating the one or more products in the container with the container ID and receiving the one or more product birth histories indicating the integrity of the container;

(d) tracking the location of the container based on the extreme condition tag and determining the integrity of the container based on the product birth histories;

(e) tracking the location of the container via one or more radio frequency (RF) interrogators capable of identifying the location of the extreme condition RFID tag;

(f) placing the one or more RF interrogators at one or more tracking device placement locations; and (g) transmitting the location of the container.

* * * * *